US012682409B2

(12) United States Patent
Istomin

(10) Patent No.: US 12,682,409 B2
(45) Date of Patent: Jul. 14, 2026

(54) PROVISION OF A TIP REGARDING STUDENT CONDUCT

(71) Applicants: Constructor Technology AG, Schaffhausen (CH); Constructor Education and Research Genossenschaft, Schaffhausen (CH)

(72) Inventor: Dmitrij Istomin, Singapore (SG)

(73) Assignees: Constructor Technology AG, Schaffhausen (CH); Constructor Education and Research Genossenschaft, Schaffhasuen (CH)

( * ) Notice: Subject to any disclaimer, the term of this patent is extended or adjusted under 35 U.S.C. 154(b) by 624 days.

(21) Appl. No.: 18/041,545

(22) PCT Filed: Aug. 17, 2021

(86) PCT No.: PCT/RU2021/050265
§ 371 (c)(1),
(2) Date: Feb. 13, 2023

(87) PCT Pub. No.: WO2022/039634
PCT Pub. Date: Feb. 24, 2022

(65) Prior Publication Data
US 2023/0306544 A1 Sep. 28, 2023

(30) Foreign Application Priority Data
Aug. 18, 2020 (RU) ................................. 2020127545

(51) Int. Cl.
*G09B 9/00* (2006.01)
*G06Q 50/20* (2012.01)
*H04L 67/50* (2022.01)

(52) U.S. Cl.
CPC ........... *G06Q 50/20* (2013.01); *H04L 67/535* (2022.05)

(58) Field of Classification Search
CPC G06Q 50/205; G06F 3/00; G06F 3/48; G06F 15/18; G06F 17/00; G06F 3/048; G06G 7/00; G09B 9/00
See application file for complete search history.

(56) References Cited

U.S. PATENT DOCUMENTS 7,346,853 B2 * 3/2008 Chen ...................... G06F 40/103
715/769
10,713,965 B2 * 7/2020 Cosyn ....................... G09B 5/06
(Continued)

FOREIGN PATENT DOCUMENTS

RU 2642406 C1 1/2018

*Primary Examiner* — Omkar A Deodhar
(74) *Attorney, Agent, or Firm* — ESPE Legal Consultancy FZ-LLC

(57) ABSTRACT

The invention relates to the field of computer engineering. The technical result consists in reducing the number of errors in the detection of breaches of remote examination regulations in automated proctoring systems. The technical result is achieved in that, if more than one breach is detected during an examination, a sum total of the weights of the detected breaches is determined and compared with at least one preset threshold value; a tip regarding the conduct of a student is returned, said tip indicating the extent to which said sum total of weights has reached the threshold value, wherein the weight of at least one breach is determined as the sum total of weights for said breach, detected in one or more modes from the following group: automatically detected, automatically detected and manually confirmed, and manually detected; wherein quantitatively differing weights are set for the same breach depending on which of the above-mentioned modes the breach was detected in.

20 Claims, 6 Drawing Sheets

(56) References Cited

U.S. PATENT DOCUMENTS

| | | | |
|---|---|---|---|
| 11,645,935 B1 * | 5/2023 | Smetters | G06V 40/168 |
| 2004/0009461 A1 * | 1/2004 | Snyder | G09B 7/02 |
| | | | 434/350 |
| 2004/0133532 A1 | 7/2004 | Seitz et al. | |
| 2014/0212865 A1 * | 7/2014 | Morgan | G09B 7/00 |
| | | | 434/350 |
| 2014/0240507 A1 * | 8/2014 | Hsu | H04N 7/185 |
| | | | 348/143 |
| 2019/0156689 A1 | 5/2019 | Jaeh et al. | |

* cited by examiner

101

PROVISION OF A TIP REGARDING STUDENT CONDUCT

TECHNICAL FIELD

The present invention relates to the field of distance learning technologies, and in particular to a method for providing hints about student behavior during a distance exam. The invention can be used in automated proctoring systems during distance exams, in which students participate using computer technology.

BACKGROUND

Automated proctoring systems assume that a student passes a control event using a computer that is connected to the Internet, and video data and sound from the room in which the student is taking the exam at that time are transmitted to a third party—the proctor observing the student. During the proctoring session, the student receives assigned control tasks from the remote server (test questions, essay topic, mathematical examples) on the computer during the proctoring session. In order to exclude the influence of dishonest behavior on the results of the control event, the student is monitored, if possible, by automated monitoring. The proctor has the ability to monitor the student's actions without being directly in the room in which the student performs control tasks. For this, any data transmitted from the student's computer to the server and then from the server to the proctor's computer is used. Traditionally, such data is audio and video data from the student's computer. If it seems to the proctor that the student is exhibiting dishonest behavior (for example, cheating), then the proctor can reprimand the student or interrupt the event for such a student.

However, in order to ensure the possibility of scaling the proctoring system, namely, to reduce the number of proctors and increase the number of students simultaneously taking tests, technologies are needed that would allow detecting dishonest behavior automatically or at least in an automated mode and reduce the participation of the proctor only to the analysis of disputable situations, for example, false positive responses of algorithms that detect bad student behavior.

Methods for monitoring the course of a remote exam in proctoring systems are known, for example, from patent applications US20070117083 (published on Nov. 21, 2006) and US20120135388 (published on May 31, 2012). Known technical solutions are aimed at automating the monitoring of the student and use the hardware and software of the student's computer to transmit streams of video, sound, and other types of data for their subsequent analysis by the proctor. Additionally, the student's biometric data can be used to identify his identity before the start of the exam. When analyzing data from a student's computer, if a student exhibits dishonest behavior, the proctor can intervene in the course of the exam to stop such behavior or completely stop the exam.

There is a known method for managing mass testing of examinees through a proctoring system, disclosed in patent application US20110279228 (published on Nov. 17, 2011). The known method uses biometric information about each examinee to identify examinees whose behavior differs from that of the majority. As a starting point of the known method, it is believed that the normal behavior of the examinee, not associated with fraud, that is, a violation of the testing regulations, is a manifestation of the behavior of the majority of examinees and can be described through a mathematical model represented by a cluster of feature vector values. In this case, the most massive cluster includes those values that are closest to each other. The feature vectors are formed on the basis of data streams received from the software and hardware of the examinees' computers. In the most common cases, these are a webcam, a microphone, means of tracking the activity of the examinee when working with system and application programs on her computer. In this case, the hypothesis of dishonest behavior of one or more examinees is accepted depending on the distance from the centroid of the mentioned cluster is the value of the feature vector calculated for these examinees. In order to avoid a large number of false positives when calculating the mentioned distance, one or more threshold values are provided, with which the actual distance of the vector calculated for the examinee from the cluster centroid is compared. When one or more thresholds are exceeded, the proctor's warning module is triggered about suspicion of dishonest behavior on the part of the examinee.

A known method of dynamic identification of the identity of the subject, disclosed in the application for patent RU2016139461 (patent No. RU2642406, published on Oct. 7, 2016). The known method makes it possible to make the procedure for checking the student's identity throughout the entire exam automatic. To achieve this, a comparison of the vector of biometric features calculated for a certain period of time for the test subject is used with the reference value for the test subject, calculated previously before the start of the exam, based on a photograph with the image of a student. At the same time, such events as the absence of the examinee or the substitution of the examinee during the exam are regarded as violations of the rules of the event. Then the scoring of violations is carried out, the essence of which lies in the fact that each of the mentioned violations is assigned a weight value depending on the severity of the violation. At the same time, the sum of the weights assigned to the violations is calculated and, throughout the entire examination, it is monitored that the calculated amount does not exceed a predetermined threshold value. When the threshold value is reached, the proctor is sent a notification about the violation of the rules of the event, while the proctor can make a remark to the student, switch to monitoring the examinee in manual mode, or stop the exam for the examinee who has shown dishonest behavior.

DISCLOSURE OF THE INVENTION

The technical problem underlying the present invention is to automate the detection of violations of the remote exam regulations.

The technical result achieved by the implementation of the present invention is to reduce the number of errors in detecting violations of the remote exam regulations in automated proctoring systems.

As an invention, a method is claimed for providing a tip regarding student conduct during a distance exam, in which the data stream is analyzed from at least one software, hardware, with which the student's computer is equipped, at least one event of the student's behavior is automatically detected in the mentioned data stream, and if the mentioned event is a violation of the regulations of the distance exam, then such an event is assigned a weight depending on the type of violation, if more than one violation is detected during the exam, then the set of weights of the detected violations is determined and compared with at least one pre-set threshold value, and a hint about the student's behavior is returned, indicating the degree of achievement of the said set of weights of at least one threshold value, while the weight of at least one violation is determined as the set of weights for this violation, detected in one or more modes from the following group: detected automatically, detected automatically and confirmed in manual mode, detected in manual mode; moreover, quantitatively different weights are set for one violation, depending on which of the mentioned modes the violation was detected.

In an embodiment, the software of the student's computer is represented by means of monitoring the desktop.

In an embodiment, the student's computer hardware is represented by a webcam and a microphone.

In an embodiment, violations, depending on the type of data stream being analyzed, are assigned to one or more of the following categories: video violations, voice violations, violations associated with desktop activity, violations associated with student identification.

In an embodiment, the conditions for classifying the event of the student's behavior as a violation of the regulations of the remote exam are pre-loaded on the student's computer.

In an embodiment, the type of violation is an indicator of the severity of this violation and is predetermined for each violation.

In an embodiment, quantitatively different weights are established for different types of violations.

In an embodiment, for the weights of violations detected automatically, an additional reduction factor is provided, which sets the weight value lower in comparison with the weights of violations detected automatically and confirmed in manual mode or detected in manual mode.

In an embodiment, the detection of violations in automatic mode is carried out simultaneously with the course of the remote exam or after its completion.

In an embodiment, the detection of violations in manual mode is carried out simultaneously with the course of the remote exam or after its completion.

In an embodiment, confirmation of violations in manual mode is carried out simultaneously with the course of the remote exam or after its completion.

In an embodiment, the tip is textual, graphic or audio information.

BRIEF DESCRIPTION OF DRAWINGS

The present description is illustrated by the following figures, intended to make the essence of the invention clear.

EMBODIMENTS OF THE INVENTION

Figure 1:
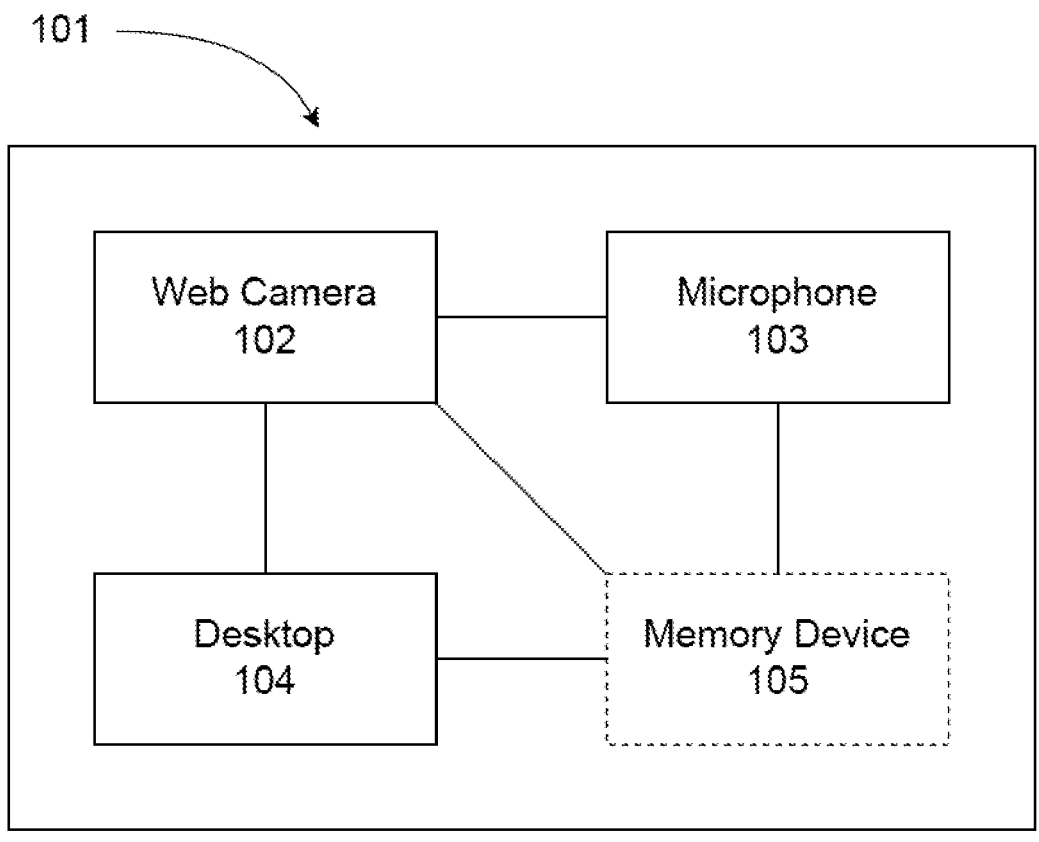
FIG. 1 illustrates a diagram of an exemplary student computer.

In accordance with the embodiment presented in FIG. 1, the computer of the student 101 can be configured in such a way as to provide the party conducting the exam, access to some resources of the mentioned computer. In the general case, a computer 101 can be any computer executed in accordance with known principles in a broad sense, that such a computer can be a personal stationary computer, or a computer specially provided to the student, configured for conducting an exam, as well as non-stationary devices, such as a laptop or smartphone. More specifically, in order to configure the student's computer to conduct a remote exam, such a computer must be equipped with a 102 webcam, which allows to conduct a video recording of the student's face and his environment, a microphone 103, which allows the recording of student's voice and sounds from his environment, as well as to be able to provide access to the resources of the operating system for observing the desktop 104. The term "desktop" is understood as a screen interactive environment that allows the user to access the computer storage and computer applications, as well as to switch between active windows of running applications.

Other software and hardware of the computer 101 may also be involved in the implementation of the invention, for example, a storage device 105 that allows recording and executing, in addition to the operating system, drivers and application software, also the software necessary for conducting a remote examination and monitoring student behavior during the exam through the webcam 102, the microphone 103 and the desktop 104. The storage device 105 may be represented by random access memory, read only memory, or other known form of memory devices. In addition to the software and hardware mentioned earlier, the computer 101 must also include user input devices such as a keyboard, mouse, and touch input. It should be noted that the options and requirements for the student computer 101 discussed herein are also valid for any other computer that may be used to implement the present invention, such as proctor or tutor computer.

Figure 2:
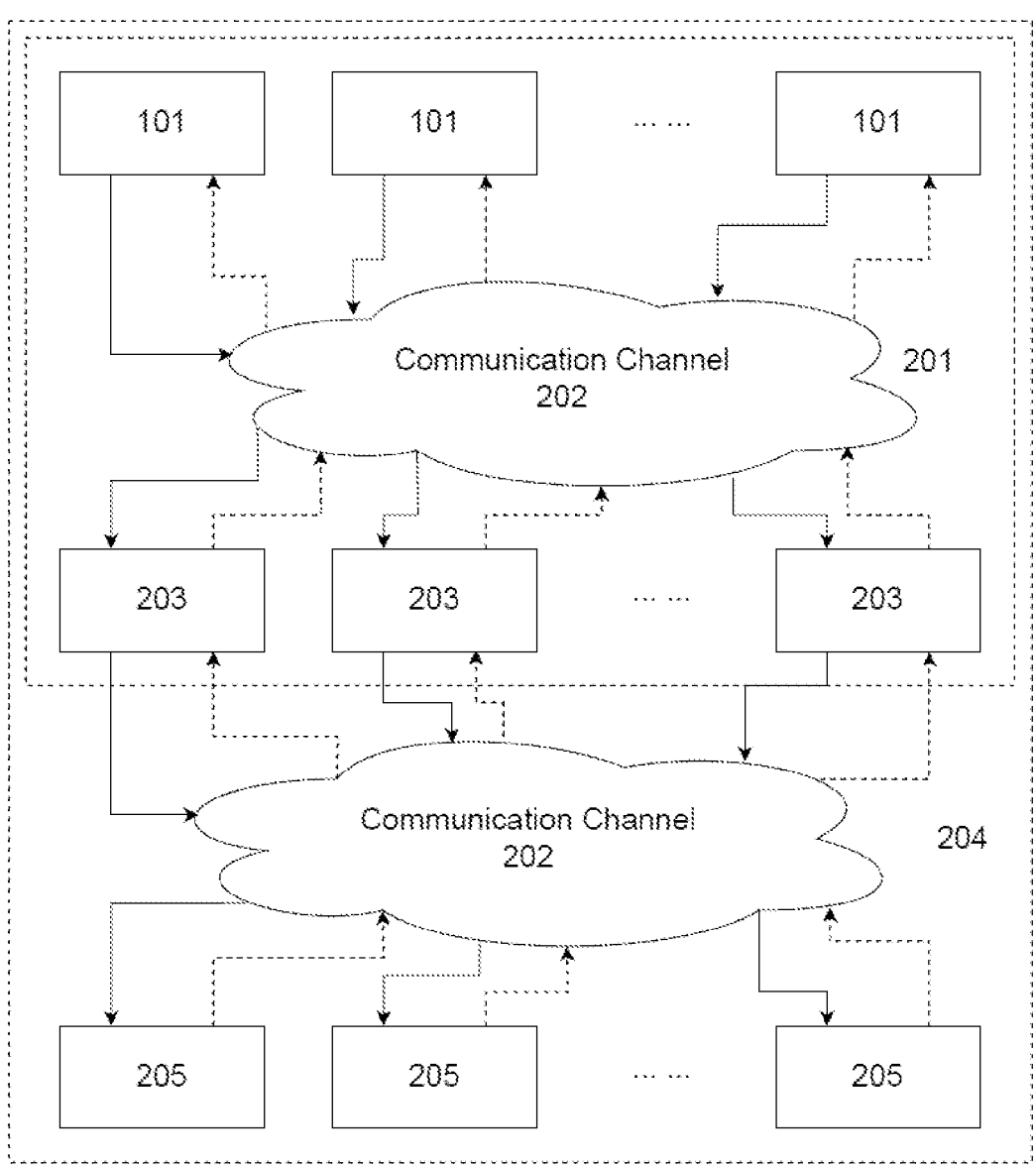
FIG. 2 illustrates diagrams of synchronous and asynchronous modes of proctoring.

According to the embodiment shown in FIG. 2, the proctoring procedure can be performed in asynchronous or synchronous mode. The asynchronous proctoring mode 201 assumes that any number of student computers 101 can be networked via communication channels 202 operating over the Internet, through which data is exchanged between computers 101 and server infrastructure 203. Server infrastructure 203 can consist of any number of physical or virtual servers and can be a centralized or distributed infrastructure. As an example, consider a distributed server infrastructure in which each of the servers is a stack consisting of a media server, a web server, and a business logic server. The media server is designed to provide broadcasting and recording of video streams; through the web server, provide interaction between the web browser of the computer 101 and the business logic server; the business logic server includes service services and databases, with the help of which it is possible for various purposes to store and process data coming to the server infrastructure 203 from computers 101, and vice versa, to send commands, data, signals from infrastructure 203 to computers 101. The results of the proctoring are stored and processed in the infrastructure 203, and then after the end of the proctoring session, the results are available for review from any computer that is suitable for this and has the rights to access the mentioned results.

Synchronous mode 204 assumes a similar nature of interaction between computers 101 and infrastructure 203, but additionally includes simultaneous interaction with the infrastructure 203 of the computers 205 of the projectors via a communication channel 202 operating over the Internet. The proctoring results are stored and processed in the infrastructure 203 and made available for review in real time or after the proctoring session is completed from the proctor computer 205. With regard to computers 205, all the same provisions are valid that were made earlier with respect to computers 101 with reference to FIG. 1.

Figure 3:
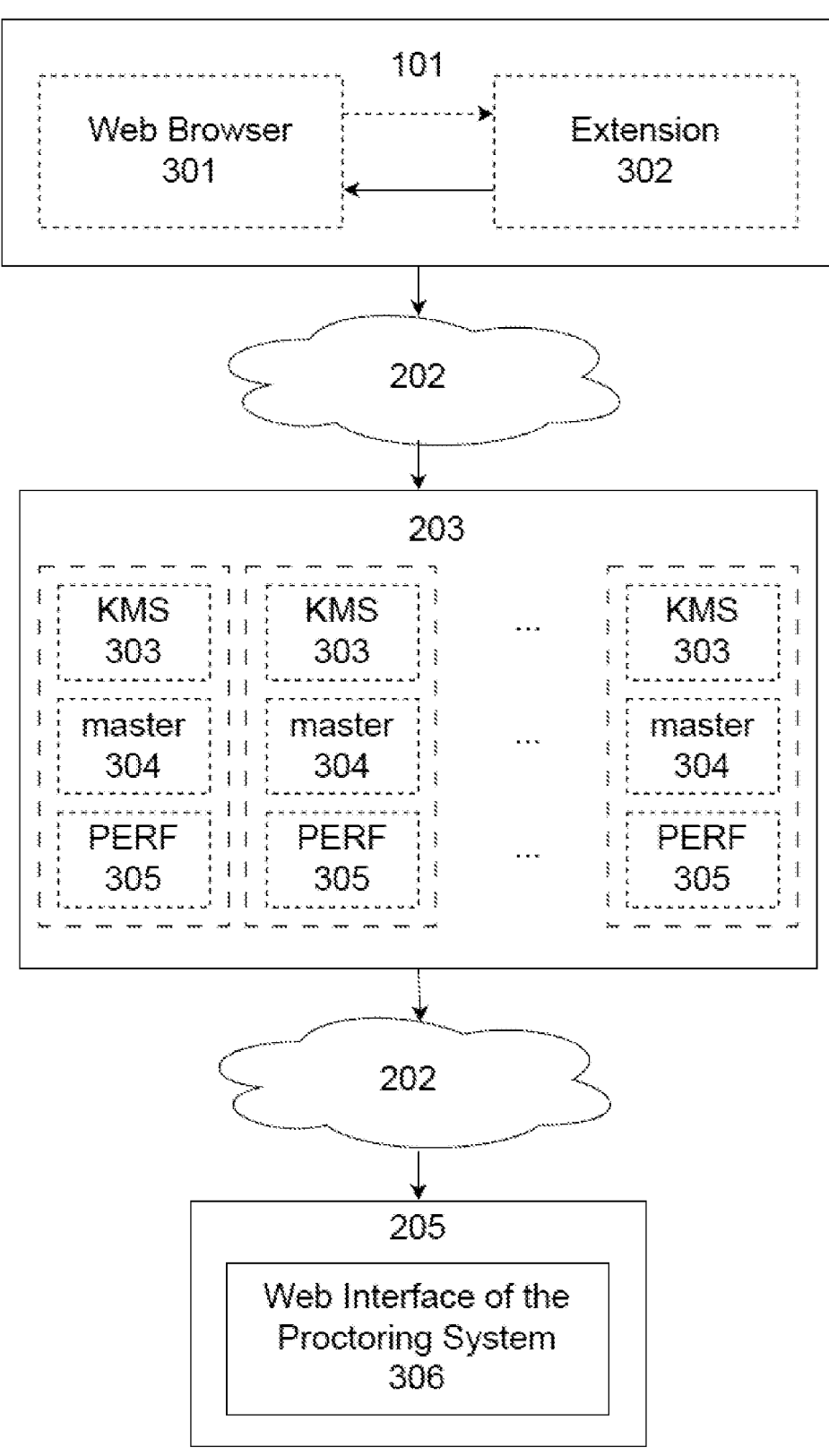
FIG. 3 illustrates the interaction scheme of software and hardware of the proctoring process.

In accordance with the embodiment presented in FIG. 3, the software and hardware of the proctoring process can be disclosed in more detail as follows. The computer 101 is equipped with a web browser 301, through which the student is provided with access to the remote exam materials, the student's personal account in the proctoring system, and other options necessary for providing proctoring. The web browser 301 can be any known and widely used web browser without any limitation. Additionally, a client extension 302 is pre-installed and launched on the computer 101, which allows retrieving the results and other intermediate proctoring data and subsequently transmitting them to the infrastructure 203 and further to the computers 205 of the proctors via communication channels 202. The client extension 302 can be launched in the operating system environment of the computer 101 or directly within the web browser 301 environment when the extension is configured as a web browser plug-in 301. Various implementations of client extensions may be provided for different operating systems, web browsers, computers 101 to provide the best software compatibility.

Infrastructure 203 may be implemented as a number of networked physical servers, each running guest virtual servers with a containerization tool package such as Docker or similar installed. Each Docker container is a running service image containing images of a virtual operating system, installation packages, and autorun scripts. The container is a running image, that is, a running virtual machine that is running all the services and packages in the image. One of three containers is installed on each guest server: KMS 303 with a media server for broadcasting and recording video streams, Master 304 with service services and databases, PERF 305 with an interaction server between the web browser of computers 101 and 205 and the media server.

The interaction of the proctor with the results of the proctoring is possible through the web interface 306 of the proctoring system. Through the interface 306, information is returned to the proctor about violations received from one or more students. The return of such information can be carried out through a chat, in which informing the proctor is carried out in the form of text or sound alerts. Also, a tip about the student's behavior is returned to the proctor via interface 306 in the form of an indication, which will be mentioned in greater detail later. Also, the interface 306 can provide the proctor with the ability to view the video stream coming from the webcam of the student's computer in real time, or from the archive in which the proctoring session is recorded.

Figure 4:
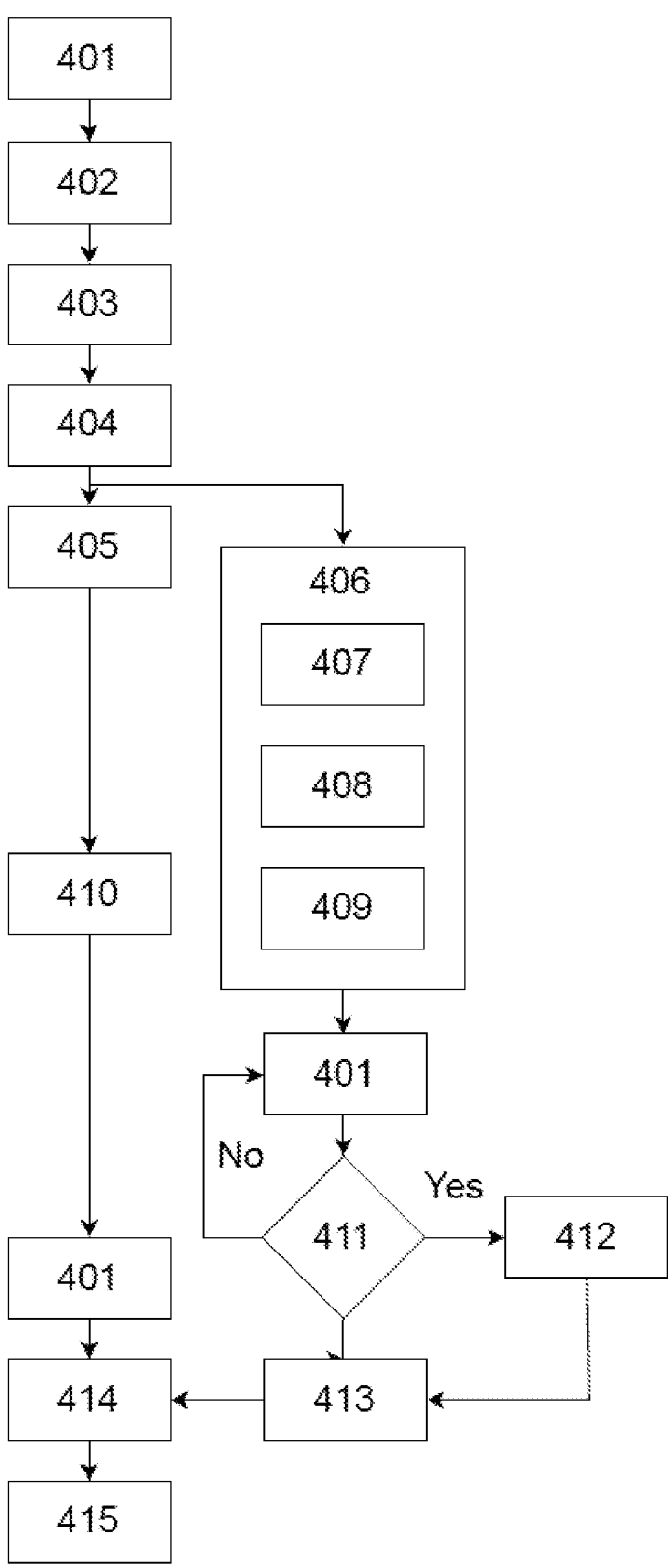
FIG. 4 illustrates a block diagram of an embodiment of a remote examination using the present invention.

According to the embodiment shown in FIG. 4, the remote examination process using the present invention may include the following steps.

The online exam begins at step 401, where the student is asked to join a confidentiality agreement. In general, such an agreement guarantees privacy for all personal data received from a student, including biometric data. Additional provisions that the student may be asked to agree to include permission to use the webcam, microphone, remote access to the desktop of his computer 101, and other computer 101 hardware and software that can be used as data sources about the student's behavior during the distance exam.

At the next step 402, the student's computer 101 is checked for compliance with technical requirements, including checking the readiness of the operating system, computer hardware, the presence of the necessary pre-installed software, and assessing the quality of the Internet connection.

At the next step 403, identification data is received from the student, which allows identification of the student in order to make sure that the student who is assigned to take the remote exam actually participates in the exam. Any identification document with a photo of the student, for example, his passport, as well as a video stream in the frames of which the student is present, can be used as identification data.

At the next step 404, the student is identified based on the identification data received in the previous step 403. Student identification can be carried out once before the start of the test part of the exam and dynamically, that is, throughout the duration of the exam. Also, identification can be done manually by the proctor or automatically. Automatic identification may be preferable in cases of mass examinations, when the number of students significantly exceeds the number of proctors. Automatic identification can be carried out by means of a neural network, which is an automatic learning face recognition system. The neural network includes a library of image processing algorithms, computer vision, and general-purpose numerical algorithms. The neural network processes the frames of the video stream received from the student's webcam and transfers the processing results to the functional module responsible for making a decision on student identification based on the similarities found between the student's face image processed by the neural network and the previously obtained image, which is a reference for the same student.

Execution of the next steps 405 and 406 may be started at the same time, with step 405 including initiating the test portion and step 406 including initiating software for monitoring student behavior during the exam. Note, however, that the use of the term "simultaneously" does not mean that the execution of steps 405 and 406 starts exactly at the same time, but only emphasizes the parallel mode of execution of these steps. In practice, the mentioned software may start its work a little earlier or later than the start of the test part of the exam.

At step 405, the student is given access to the test portion of the exam. Said materials may include test items, open-ended exam questions, math examples, written response topics without any restrictions on the form or topics of the items. Providing access to materials can be carried out by accessing a network resource or service designed for distance learning through a web browser. Also, screening test materials may be provided to the student through any other suitable means of communication, such as email or online messenger. The choice of how access is granted can be determined based on the exam regulations and can be essentially arbitrary.

As mentioned above, at step 406, the operation of the software (SW) is initiated, wherein the software is designed to monitor the behavior of the student during the exam. Preferably, said software may have a modular structure, that is, consist of functional modules. As an illustrative example, here and below, we will consider the work of three functional modules, each of which is aimed at analyzing a certain type of data that can be obtained using the software and hardware of a student's computer. Hereinafter, the terms "functional module" and "module" are used as synonyms.

Let us consider in more detail the purpose of each of the exemplary modules. The face recognition module 407 is an automatic system for capturing video violations related to student face recognition. The voice control module 408 is an automatic system for recording voice violations. The desktop control module 409 is an automatic system for recording violations that occur when a student accesses an application or directory prohibited by the exam regulations through the desktop environment. Despite the fact that the work of the software in this description is illustrated by three functional modules, in practice there can be much more such modules, depending on the specific types of violations on the part of the student that must be identified during the exam in order to consider the exam passed or failed for the student.

In parallel with the operation of the mentioned software, step 410 is performed, which is the process of interaction of the student with the materials of the test part of the exam. For example, at step 410, the results of user input or student selection of an answer to a test item are received. The time duration of step 410 is determined by the exam rules.

Based on the results of the software during step 406, tips are generated about the behavior of the student interacting with the exam materials. Tips can be intended for the proctor and provided to him in real time when one proctor observes several students at the same time. Also, tips about the student's behavior can be provided to the proctor after the end of the exam, so that the proctor can watch the video of the student taking the exam, whose behavior is suspicious, without being distracted by it directly during the exam.

A tip can be provided to the proctor in the form of an indicator, the scale of which reflects the number of penalty points received by the student as a result of automatic and/or manual proctoring. An example of a scale used would be a scale of one hundred points. Depending on the number of penalty points, the indicator may turn green when the number of penalty points is zero or significantly lower than the set threshold; yellow color when the number of penalty points is slightly below the mentioned threshold; red color when the number of penalty points exceeds the threshold. Depending on the color of the indicator, the proctoring procedure may be accepted, rejected, or require action or attention from the proctor. Note that the color indication can be arbitrary, as well as the set threshold value for changing the color of the indication and the number of threshold values, which can be more than one. One threshold value can be set at eighty points, that is, if a student receives eighty points or more, passing the exam is not counted.

The accrual of each penalty point to the student occurs under the condition 411, if any of the modules 407-409 found a violation of the exam regulations. All violations can be divided into several classes, depending on the nature of the violation. So, if the violations are divided into two classes—minor and significant, then penalty points can be awarded as follows: for each minor violation, the student is awarded ten points, for each significant violation—twenty points. Minor violations can be considered as a long look away, talking during the exam, the presence of another person in the video stream from the webcam. The absence of a student in the frame, the substitution of a student, the use of books or notes, changing the active desktop window, accessing a site, or using software that are not allowed based on the exam regulations can be considered as significant violations.

The procedure for calculating penalty points for the purposes of the present invention will be referred to as the procedure for scoring violations 412. The specific value of the penalty point for a student is one of the results of proctoring and is then transmitted to the analytical system at step 413, where it can be reflected in the activity rating of an individual student or a group of students. Scoring of violations can be carried out both for an individual student and for a group of students taking a distance exam from one or different computers.

Then, at step 414, the result of the verification test is obtained, the proctoring results are associated with it, and at step 415 this information is recorded in an archive that can be accessed by the proctor or any other person who has authorized access to such data, for example, a course administrator or tutor.

Figure 5A:
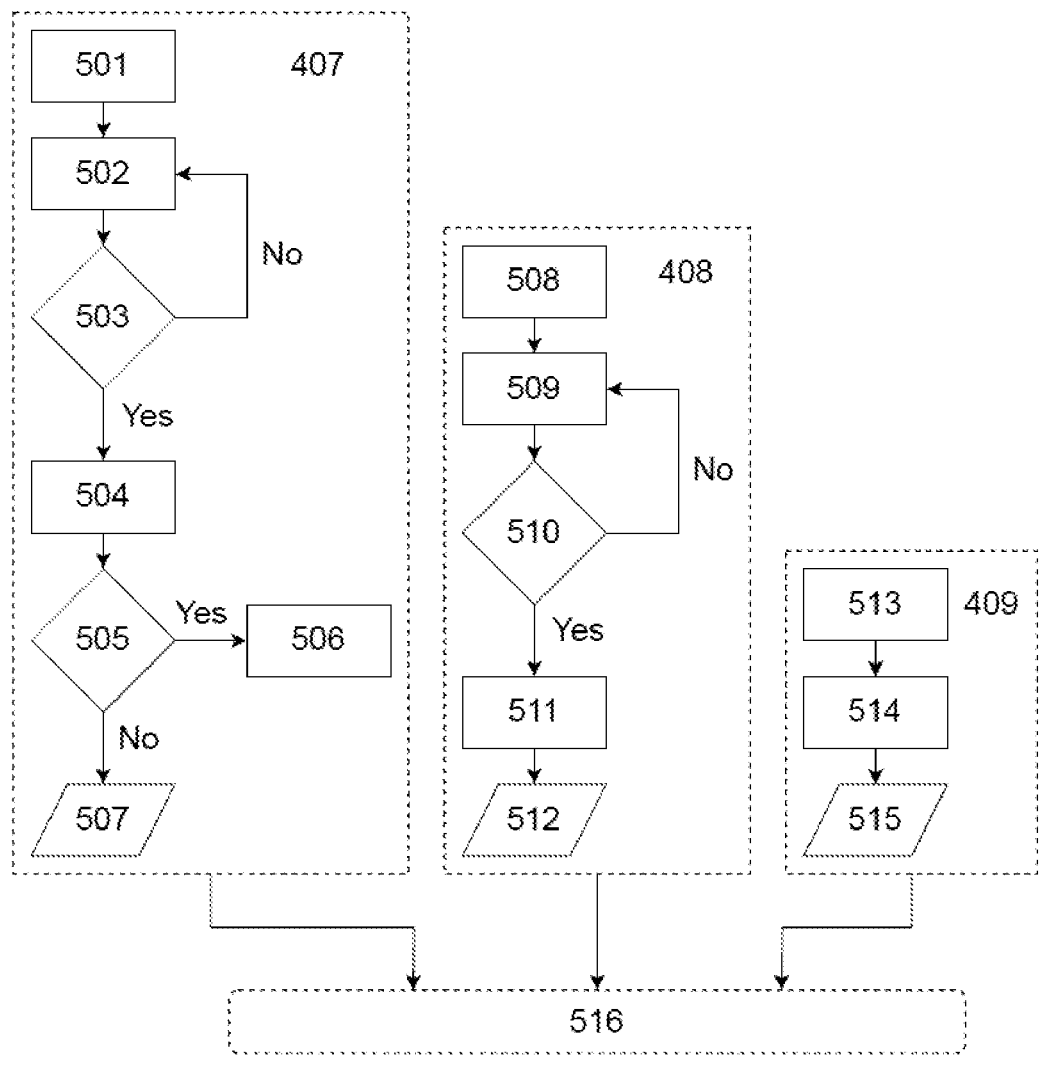
FIG. 5A illustrates the beginning of a flowchart of a variant of the violation scoring procedure.
Figure 5B:
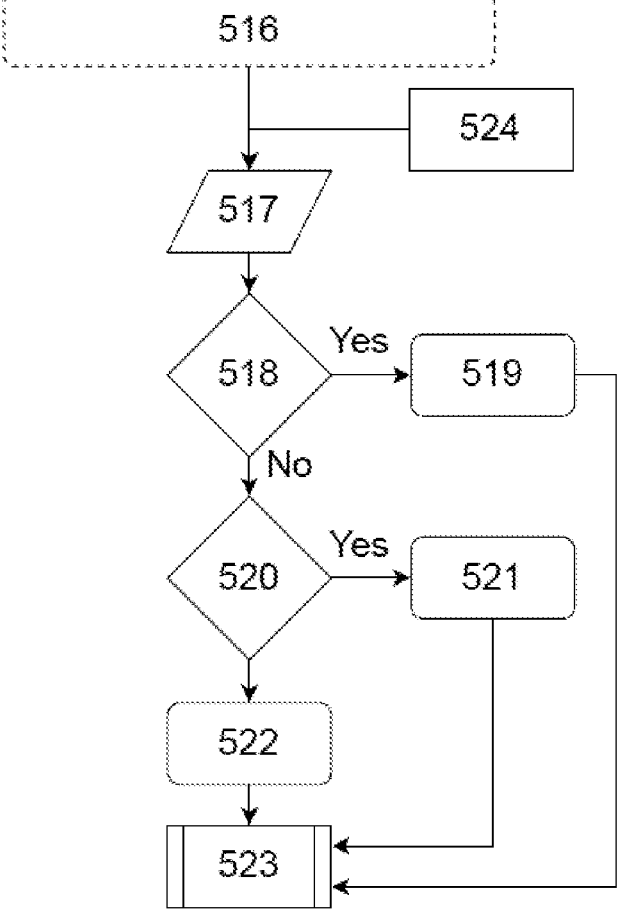
FIG. 5B illustrates the end of the block diagram of a variant of the violation scoring procedure.

In accordance with the embodiment presented in FIG. 5A and FIG. 5B, the violation scoring procedure can be carried out as follows.

As illustrative but not limiting examples of the present invention, consider the scoring procedure for the following categories of violations. As noted above, the face recognition module 407 is designed to capture video violations; the voice control module 408 is designed to record voice violations; the desktop control module 409 is designed to capture violations associated with activity on the desktop.

Categories of violations may include several typical events that are regarded as violations depending on the exam regulations.

The category of video violations includes, without limitation, the following events: the student's gaze away from the computer screen, the absence of the student in the frame, the use of books or notes, the use of third-party technical means.

The category of voice violations includes, without limitation, the following events: the presence of a conversation during the performance of a supervised event, the detection of a student's voice or extraneous voices.

The category of violations associated with desktop activity includes, without limitation, the following events: changing the active desktop window, using sites or software that are prohibited by the exam rules.

A feature of human behavior is the fact that each violation does not occur instantly, therefore, it cannot be discrete, it takes time (a continuous segment lasting more than 1 second) necessary for the object to perform an action that is an event of one of the categories of violations and can be fixed in the proctoring system.

Modules 407-409, while active, check their associated data type, waiting for an event to be recognized.

During recognition 501 of an event from the category of video violations, the module 407 initiates the execution 502 of the function subCam$_{auto}$ that is recording video violations. After receiving data about the beginning of recording a video violation, a timer is activated with a predetermined time interval, for example, within five minutes. At step 503, a check is made of the type of events to be recognized within a predetermined time interval. If the check 503 fails, then the process returns to step 502. If the check 503 succeeds, then the recognized events are grouped 504 and the violation type is assigned 505 to the grouped event. If the violation is significant, then it is assigned a weight of 506, based on the P(1)* cybCam$_{auto}$ function, in which:

P(1) is the assigned weight for the first type of violation (major violations).

Otherwise, if two types of violations are defined (major and minor), then the violation is assigned a weight of 507, based on the function P(2)*cybCam$_{auto}$, in which:

P(2) is the assigned weight for the second type of offense (minor offenses).

Libraries and algorithms that allow to recognize events associated with video violations provide an accuracy of 64-82% for event recognition. This percentage of accuracy results in false positives or false negatives. However, if a violation actually occurs, then several detections occur within a short period of time. In practice, the number of detections can be three or more cases in one minute.

Therefore, checking 503 with a timer is the preferred step to reduce the impact of automatic event recognition on proctoring results.

Upon recognition 508 of an event from the category of voice impairments, the module 408 initiates the receipt 509 of a cybVoice$_{auto}$ value that captures voice impairments. After receiving data about the start of recording a voice violation, a timer is activated with a predetermined time interval. At step 510, a check is made of the type of events to be recognized within a predetermined time interval. If check 510 fails, then return to step 509. If check 510 fails, then recognized events are grouped 511. For voice impairments, only one type of impairment can be defined, preferably minor. In such a case, the violation is assigned a weight of 512, based on the value of P(2)*cybVoice$_{auto}$, in which:

P(2) is the assigned weight for Type 2 (minor) violations.

The value of cybVoice$_{auto}$ is calculated for the entire period of the exam, according to the rule of no double punishment for the same conversation. The automatic voice detection function can be limited to no more than one warning per minute, so as not to overload the proctor or tutor chat with the same type of violations.

During recognition 513 of an event from the category of violations associated with desktop activity, the module 409 initiates the execution 514 of the cybDesk$_{auto}$ function. As each desktop event is detected, it is assigned a weight of 515 based on the P(2)* cybDesk$_{auto}$ value, in which:

P(2) is the assigned weight for the second type of offense (minor offenses).

In addition to the three categories of violations mentioned above in the proctoring system, dynamic identification of the student's identity cybIdent$_{auto}$ can also be carried out for violations related to the identification and verification of people in the frame.

The violations identified during the proctoring session and their weights are then processed 516, for example, their sum is calculated to determine the student's current score. Considering the weights that are provided for each of the violation categories, the formula for the current scoring score will be as follows:

$$F=\Sigma(P(1V2)\times cybCam_{auto}(N)+P(2)\times cybVoice_{auto}(N)+P(2)\times cybDesk_{auto}(N))$$

Where P(1V2) is the set weight for the violation, depending on the type (1—major violations or 2—minor violations);

cybCam$_{auto}$(N)–video violation number;
cybVoice$_{auto}$(N)–voice violation number;

The weight for the violation from each category is set depending on the dimension of the scale. For example, the weight can be calculated in points and range from 10 to 20 points, depending on the type of violation, with a maximum possible value of 100 points, at which the student is automatically considered to have failed the exam due to a violation of the regulations.

The proctoring score value F may be automatically updated during the entire proctoring session. At the same time, throughout the session, the proximity of the value of the estimate F and the pre-set threshold value K is monitored by 517.

The threshold value K is set based on the degree of disciplinary control of the event. The sum of the weights of all violations of the user has a limit of 100 points, in the form of normalization of the evaluation scale. Based on this, if the threshold value of 100 points is selected, then proctoring for all control measures is considered passed and user sessions have a positive Correct status. If a threshold value of 0 points is selected, then proctoring for all control activities has the Incorrect status and requires additional manual review by proctors and/or tutors. If the threshold value is more than half of 100 points, it means that several violations (more than two) are allowed. If the threshold value is less than half, then the strict scoring mode is selected, implying a minimum number of violations (for example, one or two violations). In addition to the threshold value, the allowable number of violations for a particular distance exam can be set, which is necessary for calculating the weighting characteristics of violations.

In the case of check 518, if the score F exceeds the threshold value K, then the student is not credited for proctoring due to the excess 519 of the number of permissible violations. Otherwise, it proceeds to test 520, in which case, if the score F exceeded the lowered threshold value of 0.75K, then a tip about the student's suspicious behavior 521 during the exam is returned to the proctor. If the value of F did not exceed the value of 0.75K, then proctoring for the student is considered successful, without exceeding the number of permissible violations. In this case, a tip is returned to the proctor that the student's behavior is in good faith 522. At the end of the session, data on automatically detected violations are recorded in the archive 523. Also, the archive can include fully or partially streaming data obtained during the remote exam from the computers 101 of students.

Preferably, the results of automatic proctoring should be supplemented by the results of manual detection of violations 524, when the proctor monitors the data streams from the student's computer 101 in real time during the remote exam or reads them after the end of the exam.

Example. Carrying out a scoring procedure that combines the results of automatic projection and detection of violations in manual mode.

For a remote exam, weighting factors can be set for each type of violation. The setup can be represented as follows.

A) Determine the allowable number of violations of the first type: F(1);

B) Calculate the weight of the type 1 violation:

$$Pn(1) = \frac{K}{F(1)^2}$$

where K is the threshold, F(1) is the number of violations of the first type;

C) Determine the allowable number of violations of the 2nd type: F(2);

D) Calculate the weight of the type 2 violation:

$$Pn(2) = \frac{K}{F(2)}$$

E) Comply with the condition:

$$Pn(1){\ge}Pn(2);$$

F) Calculate the reduction factor for type 2 violation:

$$G = \frac{Pn(2)}{Pn(1)}$$

The work of the scoring function can be defined for three cases of obtaining proctoring results:
detected automatically;

detected automatically and confirmed manually; detected in manual mode.

With fully automatic proctoring, the function includes only the parameters for automatic fixing of violations, the weighting characteristics of automatic violations are applied with a reduction factor.

In case of mixed proctoring, the function includes both the parameters of automatic recording of violations and the reference weight values of violations recorded manually, while only confirmed automatic violations, weight, are taken into account.

When manually fixing violations, the weight of the assessment of the proctor and/or tutor is a reference with a coefficient equal to one. Each violation recorded by the proctor and/or tutor is a priori considered positive and is subject to mandatory inclusion in the calculations according to the formula.

Let us consider in more detail an example in which the proctoring procedure is carried out in a mixed mode, that is, combines the results of automatic projection and manual detection of violations.

A) $cybCam_{auto}$ violation parameters

From the entire exam time t, such time intervals $X_t$ are searched for that the number of violations of the same type (cybCamt) a minute$\geq$3;

Each such period of time $Xt=Pn(Alert\_type)$, where Alert_type takes the value 1 or 2.

C) $cybVoice_{auto}$ violation parameters $cybIdent_{auto}(Alert\_type)=0.5Pn(Alert\_type)$.

D) Parameters of switching active window violation $cybDesk_{auto}$ t—The total duration of the exam;

$cybVoice_{auto}=>0.65$ then $cybVoice_{auto}=Pn(2)$, (type 2 proctor violation), $0.5<=cybVoice_{auto}<0.65$ then cybVoice=0.5Pn(2)

if $cybVoice_{auto}<0.5$ then cyVoice=0.

E) Parameters of manually confirmed violations $cybCamt=Tn(Alert\_type)$, where Alert_type is either 1 or 2;

$cybDeskt=Tn(Alert\_type)$, $cybVoicet=Tn(Alert\_type)$.

F) Parameters of violations detected manually by the tutor $$Pn(Alert\_type) = \frac{K}{F(Alert\_type)^2}$$

where F(Alert_type) is the number of allowed Alert type violations for the exam.

G) Parameters of violations detected manually by the proctor $Tn(Alert\_type)=Pn(Alert\_type)$.

H) Parameter "Violator" (cheat)

Cheat=K+1, where K is the threshold value.

I) Parameter "Identification"—not taken into account in the overall score if the identification result is OK or NO PHOTO, then I takes the value 0;

if the identification result is FAIL, then I takes the value −101.

J) Parameter "Identification"—taken into account in the overall assessment variable I=0, check value is output separately.

Intermediate Result $Res=cybCam_{auto}1(Alert\_type)+ \ . \ . \ . \ +cybCam_{auto}N(Alert\_type)$ $+cybIdent_{auto}1(Alert\_type)+ \ . \ . \ . \ +cybIdent_{auto}N(alert\_type)+cybVoice_{auto}1$ $+ \ . \ . \ . \ +cybVoice_{auto}N+cybDesk_{auto}1+ \ . \ . \ . \ +cybDesk_{auto}N+ \ . \ . \ . \ +cybCam_t1+ \ . \ . \ .$ $+cybCam_tN+cybident_t1+ \ . \ . \ . \ +cybIdent_tN+cybVoice_t1+ \ . \ . \ . +cybVoice_tN$ $+cybDesk_t1+ \ . \ . \ . \ +cybDesk_tN+P1(Alert\_type)+ \ . \ . \ . \ +Pn(alert\_type)$ $+T1(Alert\_type)+ \ . \ . \ . \ +Tn(alert\_type)+Cheat$ If Res>100, then Res=100;

ResI=Res+I, where I is an identification.

The final result of proctoring:

A) Proctoring passed—result equal to or below threshold K:

$O\leq ResI\leq K$,

B) Proctoring failed—result above threshold K:

ResI>K,

C) Identification failed

ResI<0.

It should be noted that the above specific details are only an example of the implementation of the present invention and are intended to make its essence more clear without any limitation. Specialists will be clear that the invention can be supplemented with many other details without deviating from its essence. The essence of the invention is expressed by the formula attached to the present description.

The invention claimed is:

1. A method for providing tips about a student's behavior during a remote exam, in which a data stream from at least one software or hardware provided with a student's computer is analyzed, at least one student behavior event is detected in said data stream; when the mentioned event is a violation of the regulations of the remote exam, then such an event is assigned a weight depending on the type of violation, when more than one violation is detected during the exam, then the set of weights of the detected violations is determined and compared with at least one pre-set threshold value, return a tip about the student's behavior, indicating the degree of achievement of the said set of weights of at least one threshold value, wherein the weight of at least one violation is determined as the set of weights for this violation, detected in modes from the following group: detected automatically, detected automatically and confirmed in manual mode, and detected in manual mode, and wherein quantitatively different weights are set for one violation, depending on which of the modes the violation was detected.

2. The method of claim 1, wherein the software of the student's computer monitors the desktop of the computer.

3. The method of claim 1, wherein the student's computer hardware is a webcam and a microphone.

4. The method of claim 1, wherein violations, depending on the type of data stream being analyzed, are assigned to one or more of the following categories: video violations, voice violations, violations associated with desktop activity, violations associated with student identification.

5. The method of claim 1, wherein the conditions for classifying the event of the student's behavior as a violation of the regulations of the remote exam are pre-loaded on the student's computer.

6. The method of claim 1, wherein the type of violation is an indicator of the severity of that violation and is predetermined for each violation.

7. The method of claim 1, wherein different types of disturbances are given quantitatively different weights.

8. The method of claim 1, wherein the weight of the violation detected automatically is provided with an additional reduction factor that sets the weight value lower in comparison with the weights of violations detected automatically and confirmed in manual mode or detected in manual mode.

9. The method of claim 1, wherein the detection of violations in automatic mode is carried out simultaneously with the course of the remote exam.

10. The method of claim 1, wherein the detection of violations in automatic mode is carried out after the completion of the remote exam.

11. The method of claim 1, wherein the detection of violations in manual mode is carried out simultaneously with the progress of the remote exam.

12. The method of claim 1, wherein the detection of violations in manual mode is carried out after the completion of the remote exam.

13. The method of claim 1, wherein the confirmation of violations in manual mode is carried out simultaneously with the progress of the remote exam.

14. The method of claim 1, wherein the confirmation of violations in manual mode is carried out after the end of the remote exam.

15. The method of claim 1, wherein the prompt is textual, graphical, or audio information.

16. A non-transitory computer-readable storage medium storing one or more programs for execution by one or more processors, the one or more programs including instructions for executing the method of claim 1.

17. A system for providing tips about a student's behavior during a remote exam, the system comprising:
    at least one processor and memory operably coupled to the at least one processor;
    instructions that, when executed on the at least one processor, cause the at least one processor to:

analyze a data stream from at least one software or hardware provided with a student's computer,
detect at least one student behavior event in the data stream,
wherein when the mentioned event is a violation of the regulations of the remote exam, then such an event is assigned a weight depending on the type of violation, when more than one violation is detected during the exam, then the set of weights of the detected violations is determined and compared with at least one pre-set threshold value, return a tip about the student's behavior, indicating the degree of achievement of the set of weights of at least one threshold value, wherein the weight of at least one violation is determined as the set of weights for this violation, detected in modes from the following group: detected automatically, detected automatically and confirmed in manual mode, and detected in manual mode, and wherein quantitatively different weights are set for one violation, depending on which of the modes the violation was detected.

18. The system of claim 17, wherein the type of violation is an indicator of the severity of that violation and is predetermined for each violation.

19. The system of claim 17, wherein the weight of the violation detected automatically is provided with an additional reduction factor that sets the weight value lower in comparison with the weights of violations detected automatically and confirmed in manual mode or detected in manual mode.

20. The system of claim 17, wherein the detection of violations in automatic mode or in manual mode is carried out simultaneously with the course of the remote exam.

* * * * *